H. HERMANNS.
POST HOLE AUGER.
APPLICATION FILED MAY 11, 1908.
902,294.
Patented Oct. 27, 1908.
2 SHEETS—SHEET 1.
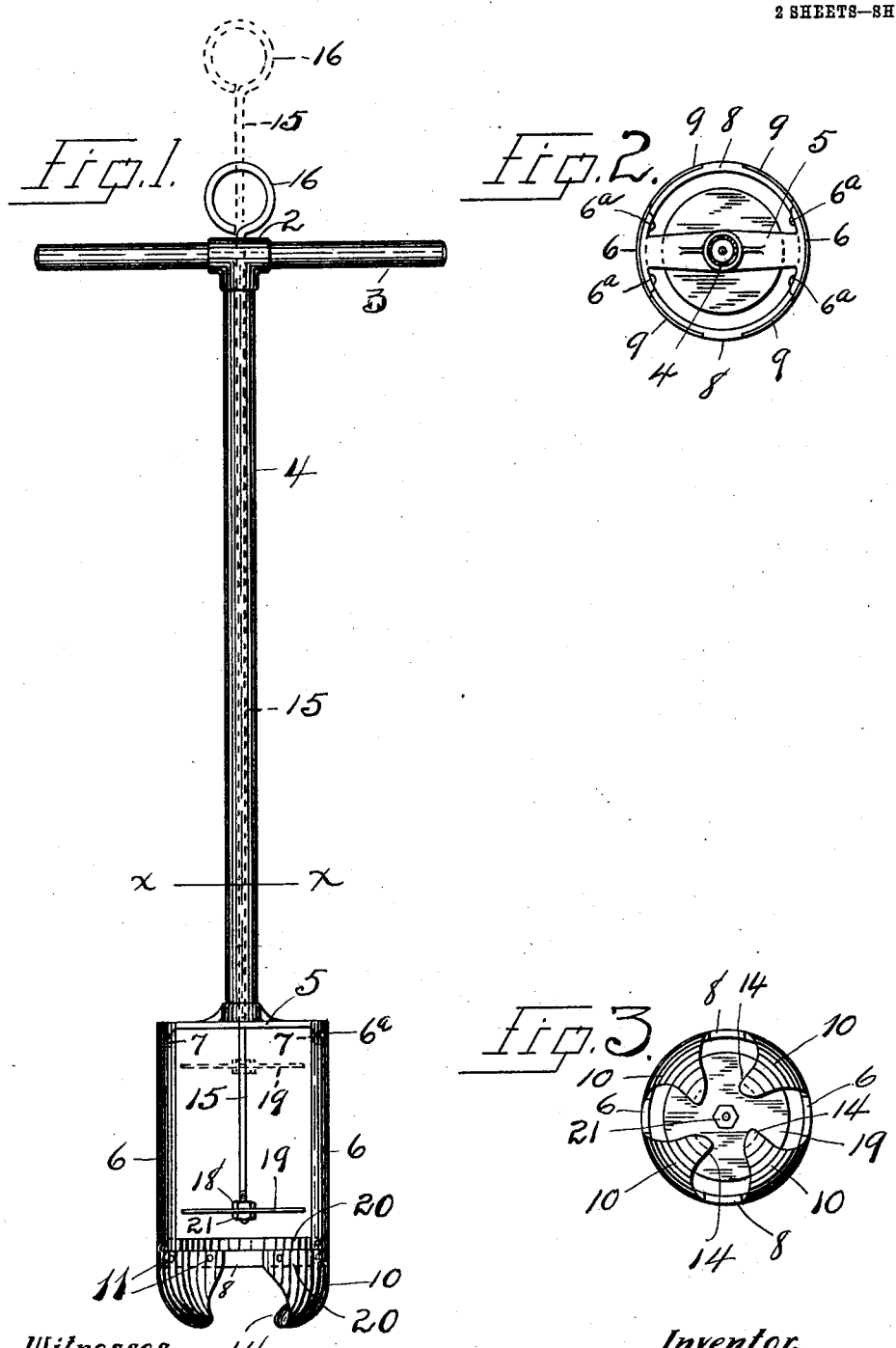
Witnesses.
C. H. Putnam.
Louise M. Canfield.
Inventor.
Herman Hermanns,
By F. M. Richards,
Attorney.

H. HERMANNS.
POST HOLE AUGER.
APPLICATION FILED MAY 11, 1908.
902,294.
Patented Oct. 27, 1908.
2 SHEETS—SHEET 2.
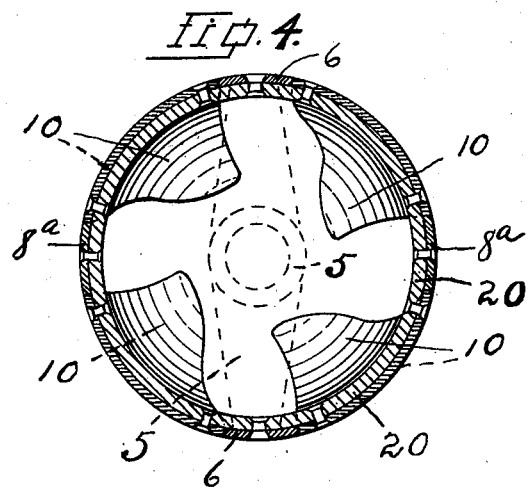
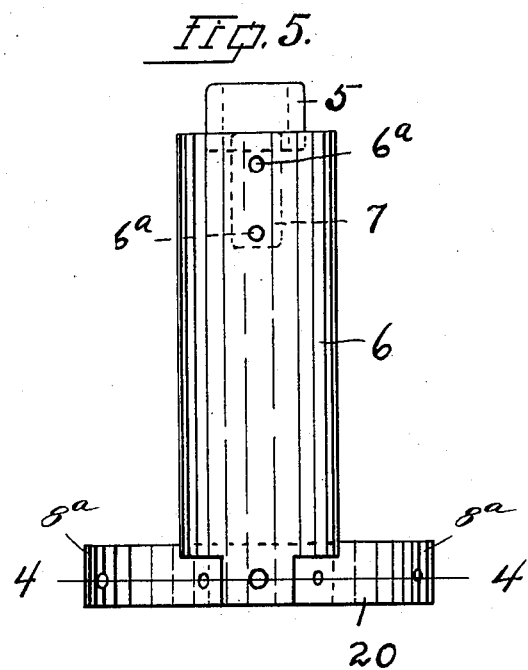

UNITED STATES PATENT OFFICE.

HERMAN HERMANNS, OF GALESBURG, ILLINOIS.

POST-HOLE AUGER.

No. 902,294.  Specification of Letters Patent.  Patented Oct. 27, 1908.

Application filed May 11, 1908. Serial No. 432,271.

*To all whom it may concern:*

Be it known that I, HERMAN HERMANNS, a citizen of the United States, and a resident of Galesburg, in the county of Knox and State of Illinois, have invented certain new and useful Improvements in Post-Hole Augers, of which the following is a specification.

My invention relates to devices for boring post holes, wells and other similar openings in soil.

Devices of this nature as hereinafter constructed have been lacking in that while they would work well in certain kinds of soil and where the strata were of similar texture and of like organization, they would not be efficient where other conditions prevailed. For instance, some soils are entirely of loam, some entirely of clay, some of sand and gravel, and others mixed. One device will efficiently cut into some of these soils, but will not lift the cut soil therefrom. Others will be stopped because of striking a stone or the like. Others will clog, and I am not aware of any which will lift very sandy soil.

The principal object of the invention is, therefore, to provide a device of the nature described which is capable of efficient work in any kind or character of soil; which is very strong; which will not spread at its cutting portions; which will pick up and lift small stones, pebbles and the like; which will bore its own way, after starting, without downward pressure by the operator; which is economic of construction; which is composed of replaceable parts which may be duplicated in the event of breakage; which will not re-cut the soil; and which includes means whereby sand and dry, pulverized soil may be compacted while in the hole and thereby lifted therefrom.

Other objects are to provide novel features of construction and assemblage, while still further objects will be in part obvious and in part pointed out.

Mechanism showing a device of the character embodied in the best way now known to me is illustrated in the accompanying sheet of drawing, in which:

Figure 1 is an elevation, showing by full lines the relative positions of the parts when the operation of boring is about to be begun, and by dot lines their positions after the auger is filled and the soil gathered thereby is compacted. Fig. 2 is a top plan taken in the line $x$—$x$ in Fig. 1; Fig. 3, a bottom plan; Fig. 4, a section in the line 4—4 in Fig. 5; and Fig. 5, a detail in elevation.

Attention being now directed to the numerals on said drawings, the same one indicating the same part in the different figures, 2 indicates a tubular T into the horizontal opening of which is driven or otherwise fitted a handle 3. A tubular shank 4 is threaded or otherwise fixed to the depending member or stem of the T and carries at its lower end a cross-head 5 preferably threaded thereonto. All these parts may be of piping or other suitable material, but in constructing the device I prefer that the handle be of wood.

The vertical cutters or frame-bars 6 are slightly curved in their cross sections to conform to the cylindrical contour of the hole and thereby avoid friction. They are preferably fixed by rivets $6^a$ at their upper portions to the depending arms 7 of the cross-head, and at their lower portions are fixed to and carry a ring or annulus 20 provided at its lower portion with lugs or bosses 8, which bosses may be omitted, and inserts $8^a$ riveted to the ring if preferred. These inserts are indicated at Fig. 4, and are practically identical with the bosses, the only difference being that the latter are integral with the annulus. The lower edge of the ring 20 is preferably sharpened in order that it may more readily enter the ground. The upper edges 9 of a series of boring blades 10 are fixed by rivets 11 to the ring 20 between the vertical cutters 6 and the lugs 8, whereby a cylindrical body is completed. The boring blades are bent inwardly and downwardly at their lower portions, and the cutting edges 14 bent slightly upward, but are not directed toward a common center, see Fig. 3. Thus constructed, each blade cuts its own path or way and at the same time picks up or gathers the soil which it has cut. Moreover, should one of the borers contact a stone or the like, it will loosen it and turn it into position to be gathered by the next succeeding blade. The dirt coming in below it, caused by continued boring, will cause it to be retained within the casing.

The T 2 is centrally apertured at its top for the reception of a rod 15 provided at its upper portion with a handle 16. The rod 15 passes freely through an aperture in the handle and through the shank and cross head, its lower end being threaded for the reception of a jam nut 18 which constitutes a shoulder or abutment for an apertured compacting disk 19 which disk is further secured in place by a nut 21 or by riveting the end of the rod 15. While I have shown a flat disk, an inverted cup-shaped one may be employed if deemed preferable.

No prior cutting by a spade or otherwise is necessary to start the operation of my device. Slight pressure being brought to bear upon the handle, the auger-shaped blades will bite into soil or hard dirt, and after once started the pressure may be discontinued. Each auger blade gathers its own dirt, and the vertical blades cut a true cylindrical hole. The bottom of the completed hole will be substantially at a right angle to the sides thereof, so that water will not collect therein to cause the post to rot, decay, or become loosened.

The principal advantage of my invention is, however, that in working in sandy or other dry and pulverized soils, the operator will, when the casing is filled, tamp the contained mass by means of the compacting disk. It will be evident that the auger blades form a floor and that the vertical cutters form a side wall; and these together with the compacting disk form a casing having a top, bottom and sides. The dirt will be securely held within said casing until withdrawn from the hole, whereupon a slight tap, as will be spontaneously given by letting the casing fall upon its side, will cause the dirt to be discharged therefrom. Moreover, in the event of a root being encountered, it will be severed by the peculiarly shaped and hereinbefore described auger blades.

Having thus described my invention, its construction, operation and advantages, I claim as new and desire to secure by Letters Patent the following, namely:

1. In combination in a device of the character described, a tubular shank, a casing at the lower end thereof, a rod loosely seated in said shank, a compacting disk thereon and within said casing, the lower portion of said casing comprising boring blades having inwardly directed extremities.

2. In a device of the character described, a tubular shank, a cross-head at the lower end thereof, vertically disposed cutting blades carried thereby, a ring to which the lower end of said blades are fixed, boring blades fixed to said ring, their extremities bent inwardly, a rod loosely mounted in said shank, and a compacting plate carried by said rod and adapted to coöperate with said boring blades, whereby the soil cut thereby may be tamped while in the hole.

3. In a device of the character described, a tubular shank, a cross-head at the lower end thereof, vertically disposed and spaced cutting blades carried thereby, whereby discharge of soil is permitted, a ring to which the lower ends of said blades are fixed, boring blades depending from said ring, their extremities bent inwardly, a rod loosely mounted in said shank, and a compacting plate carried by said rod and adapted to coöperate with said blades, whereby the soil cut thereby may be tamped while in the hole.

4. In a device of the character described, a tubular shank, a cross-head at the lower end thereof, vertically disposed spaced cutting blades carried thereby, whereby discharge of soil is permitted, a ring to which said blades are fixed, there being peripheral protuberances on said ring, boring blades fixed on said ring, a portion of them spaced by the lower ends of the vertical blades and another by said protuberances, the extremities of the boring blades bent inwardly but not directed toward a common center, and a compacting plate carried by said rod and adapted to coöperate with said blades, whereby the cut soil may be tamped within and lifted from the hole.

In testimony whereof I have hereunto set my hand this 23rd day of April 1908, at Galesburg, Illinois.

HERMAN HERMANNS.

Witnesses:
  LOUISE CANFIELD,
  C. H. PUTNAM.